(12) United States Patent
Cohen et al.

(10) Patent No.: US 11,924,232 B2
(45) Date of Patent: Mar. 5, 2024

(54) ESTABLISHING AND MAINTAINING SECURE DEVICE COMMUNICATION

(71) Applicant: SCHNEIDER ELECTRIC USA, INC., Andover, MA (US)

(72) Inventors: Daniel C. Cohen, Newton, MA (US); Victor Danilchenko, South Hadley, MA (US)

(73) Assignee: Schneider Electric USA, Inc., Andover, MA (US)

( * ) Notice: Subject to any disclaimer, the term of this patent is extended or adjusted under 35 U.S.C. 154(b) by 87 days.

(21) Appl. No.: 17/612,285

(22) PCT Filed: May 20, 2020

(86) PCT No.: PCT/US2020/033727
§ 371 (c)(1),
(2) Date: Nov. 18, 2021

(87) PCT Pub. No.: WO2020/236891
PCT Pub. Date: Nov. 26, 2020

(65) Prior Publication Data
US 2022/0224704 A1   Jul. 14, 2022

Related U.S. Application Data

(60) Provisional application No. 62/850,686, filed on May 21, 2019.

(51) Int. Cl.
*H04L 29/06* (2006.01)
*H04L 9/40* (2022.01)

(52) U.S. Cl.
CPC .............................. *H04L 63/1425* (2013.01)

(58) Field of Classification Search
None
See application file for complete search history.

(56) References Cited

U.S. PATENT DOCUMENTS 9,378,361 B1\* 6/2016 Yen .......................... H04L 63/14
9,912,478 B2\* 3/2018 Alexander .......... H04L 63/0823
(Continued)

FOREIGN PATENT DOCUMENTS

EP    3343968 A1    7/2018

OTHER PUBLICATIONS

International Search Report dated Jul. 30, 2020 for PCT/US20/33727 (Form PCT/ISA/210), 1 page.
(Continued)

*Primary Examiner* — Sithu Ko
(74) *Attorney, Agent, or Firm* — Locke Lord LLP

(57) ABSTRACT

Techniques for dynamically generating a trust level for an IoT device are described. A plurality of characteristics for a first device of a first device type are analyzed against a set of expected characteristics of the first device type. Embodiments monitor runtime behavior of the first device over a window of time to collect runtime behavior data and analyze the runtime behavior data for the first device to determine whether the device is operating in a manner consistent with the first device type. Upon determining that the analyzed plurality of characteristics is consistent with the set of expected characteristics and that the first device is operating in a manner consistent with the first device type, embodiments generate a security profile for the first device designating the first device as a trusted device.

20 Claims, 13 Drawing Sheets

(56) References Cited

U.S. PATENT DOCUMENTS

| | | | | |
|---|---|---|---|---|
| 10,152,596 B2* | 12/2018 | Pieczul | .................... | G06N 5/04 |
| 10,270,770 B1* | 4/2019 | Irwan | .................. | H04L 63/0876 |
| 10,390,227 B2* | 8/2019 | Bicket | .................... | H04W 4/38 |
| 10,706,155 B1* | 7/2020 | Veselov | .............. | G06F 9/45558 |
| 11,469,906 B2* | 10/2022 | Venkateswaran | ..... | G06F 21/606 |
| 11,550,900 B1* | 1/2023 | Engels | ................ | G06F 12/1491 |
| 2003/0004663 A1 | 1/2003 | Masella et al. | | |
| 2003/0217345 A1 | 11/2003 | Rajsuman et al. | | |
| 2006/0200546 A9 | 9/2006 | Bailey et al. | | |
| 2008/0188974 A1 | 8/2008 | Knipfer et al. | | |
| 2010/0321155 A1 | 12/2010 | Ballard | | |
| 2010/0332856 A1 | 12/2010 | Song | | |
| 2011/0315758 A1 | 12/2011 | Shuman et al. | | |
| 2013/0018972 A1 | 1/2013 | Sargent et al. | | |
| 2015/0215177 A1 | 7/2015 | Pietrowicz et al. | | |
| 2017/0063889 A1* | 3/2017 | Muddu | ................ | H04L 43/045 |
| 2018/0191577 A1* | 7/2018 | Herczog | ............ | H04L 63/1416 |
| 2019/0044949 A1 | 2/2019 | Bartfai-Walcott et al. | | |
| 2021/0029156 A1* | 1/2021 | Sharifi Mehr | ........ | H04L 67/303 |

OTHER PUBLICATIONS

Extended European Search Report for European Patent Application for European Patent Application No. EP20809578.6, dated Dec. 19, 2022.

\* cited by examiner

ESTABLISHING AND MAINTAINING SECURE DEVICE COMMUNICATION

TECHNICAL FIELD

The present disclosure relates to secure data processing, and more particularly, to techniques for establishing and maintaining secure communication for Internet of Things (IoT) devices.

BACKGROUND

The Internet of Things (IoT) promises to interconnect elements together on a massive scale. Such amalgamation allows interactions and collaborations between these elements to fulfill one or more specific tasks, according to the context and environment of application. For example, tasks may range from sensing and monitoring an environmental characteristic such as temperature or humidity of a single room to control and optimization of an entire building to achieve a larger objective such as an energy management strategy. In a variety of environments, securing the data transacted by these IoT devices is highly beneficial, particularly in environments where the devices were initially deployed in an environment that had little or no cloud-based network connectivity.

IoT devices, or more generally devices that may be utilized to capture data from an environment, have existed for several years, with a variety of methods to secure the communications data associated with these deployed devices. Many previously deployed devices were designed to operate in an isolated network environment, storing collected data locally for analysis by a local computer system. However, with the advent of cloud-based connectivity, the conventional techniques used to securely connect devices in isolated network environments are not sufficient to securely connect devices in a cloud computing environment. At the same time, many of these legacy devices do not have the computing resources (e.g., processing resources, storage resources, etc.) to run modern device firmware which implements secure communications. As a result, a technical challenge exists in retrofitting these legacy devices to operate securely in modern environments.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
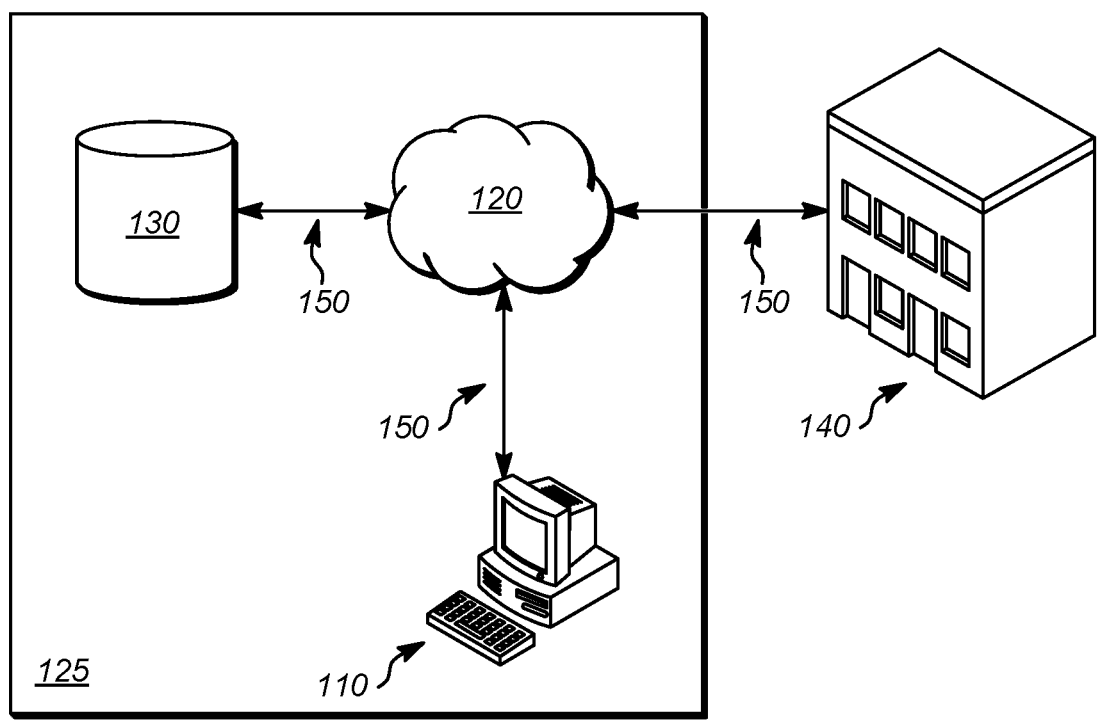
FIG. 1 illustrates aspects of a system for establishing and maintaining secure device communication, in accordance with one embodiment described herein.

In the emerging world of the Internet of Things (IoT) or more generally, Cyber Physical Systems (CPS), a convergence of multiple technologies is underway to allow the sensing, actuation, data capture, storage, and/or processing of data from a large array of connected components, including physical components, virtual components, and/or a combination of the two. These components may be accessed remotely using existing network infrastructure to allow for efficient Machine to Machine (M2M) and Human to Machine (H2M) communication. As the network of connected components changes and grows over time, an increasing amount of data from these connected components elements will be generated. Securing data associated with these dynamic sets of connected devices and components represents a significant technical challenge.

Complicating this challenge are deployed devices that have been built several generations ago that may not be prepared for the rigors of secured communication between the devices themselves and large data networks, such as cloud-based environments. Further, some of these devices may be "untrusted" to the networks they presently belong to. One challenge with legacy devices is that the chain of ownership from a factory to the present owner is often unknown, creating a potential for "untrusted" devices to exist in the field that may have been compromised by malicious actors, or for malicious device simulations which may be indistinguishable from genuine devices from a remote system's point of view. Ideally, any devices previously existing in an environment (i.e., brownfield devices) and devices newly deployed into an environment (i.e., greenfield devices) can be made to coexist and operate in conjunction with one another, as this avoids the cost of replacing the brownfield devices with greenfield devices. However, this presents a significant challenge, as many brownfield devices are not configured to operate in modern environments (e.g., where one or more components are located in a cloud computing environment), and in many cases these brownfield devices may not have the computing resources (e.g., processing and storage capabilities) to execute updated firmware that would add these capabilities.

As these IoT computing devices rapidly become more available and utilized, improperly secured IoT devices present a highly attractive target for compromising valuable data and the associated infrastructure. Data theft, creation of botnets, theft of valuable information, and performance of attacks on infrastructure via connected IoT devices are all examples of potential issues that can face IoT systems. Such attacks may typically target IoT devices that consume or provide data services directly, including (but not limited to) data generation IoT devices, IoT gateways and edge devices.

A security challenge exists for IoT devices which do not commonly apply to conventional computing devices and systems. This challenge includes securely deploying devices without regard to the generation of device that is deployed in an environment. One example of a vulnerability of systems including brownfield devices is a Denial of Service (DoS) attack utilizing unauthenticated brownfield devices. In such an attack, malicious users could create an additional load on the platform or inject false data. For example, a malicious user may create one or more login requests to the platform and/or multiple false accounts. With a sufficient volume of such accounts, a malicious user could register a sufficient volume of malicious devices which could be used to stage a DoS attack on the system (e.g., the data storage system or another part of the IoT platform).

As another example, a DoS attack could be staged against the enrollment process by "flooding" the process with requests to enroll devices. A malicious user may create multiple requests to authorize devices as a DoS on the enrollment process itself. As yet another example, a malicious user could create counterfeit devices, which can prevent real device from connecting to the platform and/or can load invalid data in the platform, thereby corrupting analytics data. For instance, a malicious user may create a malicious device which may send corrupt or very large amounts of data to the platform to exceed the processing capabilities of the platform, thereby denying legitimate devices from using the platform. A large amount of data may be maliciously sent to the platform to increase the operating costs of the platform without causing the platform to fail.

System administrators of IoT systems may mitigate the effects of such attacks using mitigation strategies, which may include restricting access of invalid users from parts of or the entire system, thereby helping to prevent malicious users from being able to create an additional load on the platform. Additionally, the enrollment process can be limited to a set number of requests to enroll devices. Moreover, enrollment can be limited by requiring the process be performed by an authenticated IDMS user. As another example, the system can restrict IDMS to require one or more of the following to create an account: multi-factor authentication, captcha portal, email verification for account creation, a unique login authentication to IDMS for each device, and the addition of rate-limiting for adding devices.

However, as discussed above, many brownfield devices may not be configured with the program logic to integrate with a modern IoT system operating in a cloud computing environment. While some devices may be "upgraded" by installing updated software that adds cloud connectivity, in many instances these brownfield devices may not have the computing resources (e.g., processing capabilities, storage capabilities, etc.) to execute such updated software logic. Moreover, even with updated software, these brownfield devices may not have the necessary data and configuration to fully integrate within a modern IoT environment. For example, many modern devices are assigned a unique identifier by the manufacturer that is stored in memory on the device, and this unique identifier is known and can be verified by the cloud computing application communicating with the device. While many brownfield devices were configured with such a unique identifier at the time of manufacture, the brownfield devices may not be authenticatable by the cloud computing application. Put another way, if a device was not configured with a unique identifier in a verifiable manner at the time of manufacture (e.g., where a secret piece of information such as a pre-shared key is pre-configured on the device during the manufacturing process and this piece of information is known to the cloud server, using public-private key infrastructure with certificates or where a private key is pre-configured and securely stored on the device at the time of manufacture, etc.), the cloud system may only be able to validate that the unique identifier of the device is a valid unique identifier but may not be able to validate the identity of the device. As a result, conventional solutions do not provide an adequate way to determine when it is acceptable to fully trust a brownfield device.

To address this security challenge, the present disclosure provides a system which considers trust elements for a particular device and uses these trust elements to generate a trust metric for the device. Generally, such trust elements may include atoms of trust and atoms of distrust. These trust elements can then be processed on a per-device level to create a trust metric for each device. Once the trust metric is created, embodiments described herein can compare the trust metric to a device-level trust threshold. Based on that processing, further action may be taken by a security management device. For example, upon determining that a particular device is sufficiently trustworthy (e.g., where the trust metric exceeds the device-level trust threshold), embodiments could begin utilizing data collected by the particular device in system monitoring activities, when generating system-level events and alerts, and so on.

FIG. 1 illustrates a system for establishing and maintaining secure device communication in accordance with one embodiment of this disclosure. As shown, the system 125 includes one or more general purpose computers 110, one or more data storage arrays 130, a cloud computing environment 120, a building or other structure 140 which contains one or more connected elements (not shown), and network connections 150 to allow the exchange of data between these parts of the system.

As illustrated in FIG. 1, a building 140 contains one or more connected elements, components, devices, and/or drive components which are physical, virtual, or a hybrid of the two, that perform sensing, actuation, data capture, storage, or processing for the monitoring or control or management of the building 140. Any variety of connected elements may be used to capture, store, or process data, or actuate associated devices over the network connections 150, to the cloud computing environment 120, to other parts of the system. These connected elements may, for example, detect temperature, humidity, ambient light, sound, smoke, carbon monoxide, carbon dioxide, motion, non-conductive fluids, conductive fluids, vibration, energy, power, voltage, current, or any other desired characteristic, and combination thereof. Connected elements may also operate or articulate elements, components, and/or other systems such as turning on lights, opening a door or window, moving window shades, or triggering a door lock. Connected elements may also process data structures from other connected elements or propagate data structures from one or more connected elements to one or more other connected elements. Any number of connected elements may be deployed in any combination to monitor or manage a physical space. Examples of such a space may include a closet, room, building, campus, office, promenade, or any other desired location.

As shown, the one or more buildings 140 containing a connected element connect to a cloud-computing environment 120 through a network connection 150. This connection allows access to the cloud computing environment 120 by a variety of devices capable of connecting to such an environment in either a wired or wireless connection manner. In the example depicted in FIG. 1, such devices include one or more general-purpose computers 110 capable of receiving input from a user or to provide autonomous operation. One or more data storage arrays 130 may be utilized to provide additional data storage capability. It should be appreciated a cloud computing environment 120, while providing additional communication paths to additional elements or systems, is not required as part of the semantic search method. Some other embodiments contemplate self-contained or stand-alone systems.

The network connections 150 may be wired or wireless connection types. Such connections may include, but are not limited to, any physical cabling method such as category 5 cable, coaxial, fiber, copper, twisted pair, or any other physical media to propagate electrical signals. Wireless connections may include but are not limited to personal area networks (PAN), local area networks (LAN), Wi-Fi, Bluetooth, LPWAN (low power WAN) cellular, global, or space-based communication networks. Access between the cloud environment 120 and any other cloud environment is possible in other implementations these other cloud environments are configured to connect with devices similar to cloud environments such as the existing cloud environment 120. It is to be understood that the computing devices shown in FIG. 1 are intended to be illustrative only and that computing nodes and cloud computing environments may communicate with any type of computerized device over any type of network with addressable or direct connections.

Principles of the disclosure include a system to establish and maintain secure device communication 125 may contain the elements details in FIG. 1, may include additional or fewer of these elements, or may be in a building 140, a series of buildings. A secure device communication system 125 may be physical, may be virtual, or a hybrid combination of both. No limitations are implied as to the composition, location, or organization of the secure device communication system 125.

Figure 2:
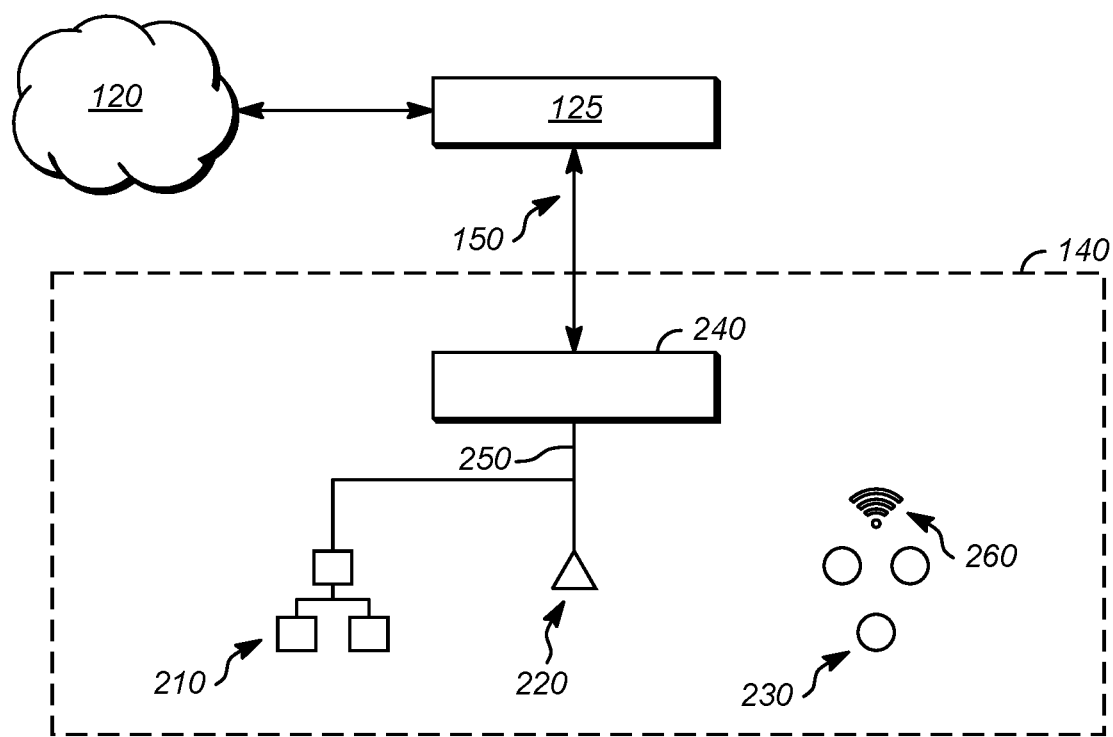
FIG. 2 illustrates different types of devices connecting to a system for establishing and maintaining secure device communication, in accordance with one embodiment described herein.

FIG. 2 illustrates various embodiments of how different types of devices may connect to a system for establishing and maintaining secure device communication in accordance with various embodiments of this disclosure may be implemented. In one embodiment of FIG. 2, the building 140 contains one or more types of connected elements 210, 220, 230, 240 for the monitoring or management of the structure. These connected elements 210, 220, 230, 240 communicate via a wired 250 or wireless 260 networks and makes the data structures from each connected element available to the secure device communication system 125 and/or the cloud environment 120 via the network connections 150.

Any variety of connected elements may be used to perform sensing, actuation, data capture, storage, or processing over the network connection 150, to the secure device communication system 125, cloud computing environment 120, to other parts of the system. For example, connected elements may be connected sensors to measure carbon dioxide 210 for monitoring air quality of the building 140 and communicate via a wired network connection 250. Connected element may be both a connected sensor to detect ambient light and an actuator 220 to change the state of an occupant light fixture and communicate via a wired network connection 250. Connected elements may be connected sensors for temperature and humidity 230 to monitor environment of the building 140 and communicate via a wireless network connection 260. Finally, connected element 240 serves as a connected gateway to communicate with the associated connected elements 210, 220, 230, via their respective network connections 250, 260, process the data structures of each, and transmit same to a network connection 150 for transmission to the cloud environment 120. It should be appreciated a cloud computing environment 120, while providing additional communication paths to additional devices or systems, is for illustrative purposes only and is without limitation. Other embodiments contemplate self-contained or stand-alone systems.

These connected elements need not be geographically localized or logically grouped in any way to utilize embodiments of this disclosure. Grouping connected elements geographically or logically may allow more economic use. A geographic grouping such as in an apartment, home or office building may be accomplished, as well as logically locating connected elements by function. One of many logical grouping examples may be locating connected end points designed to sense temperature, proximate to an occupied location to detect changes in environment. It should be appreciated that the groupings of connected endpoints may also be located on a very large geographic scale, even globally. Such global operations may be monitored through a network located in any number of facilities around the globe.

Figure 3:
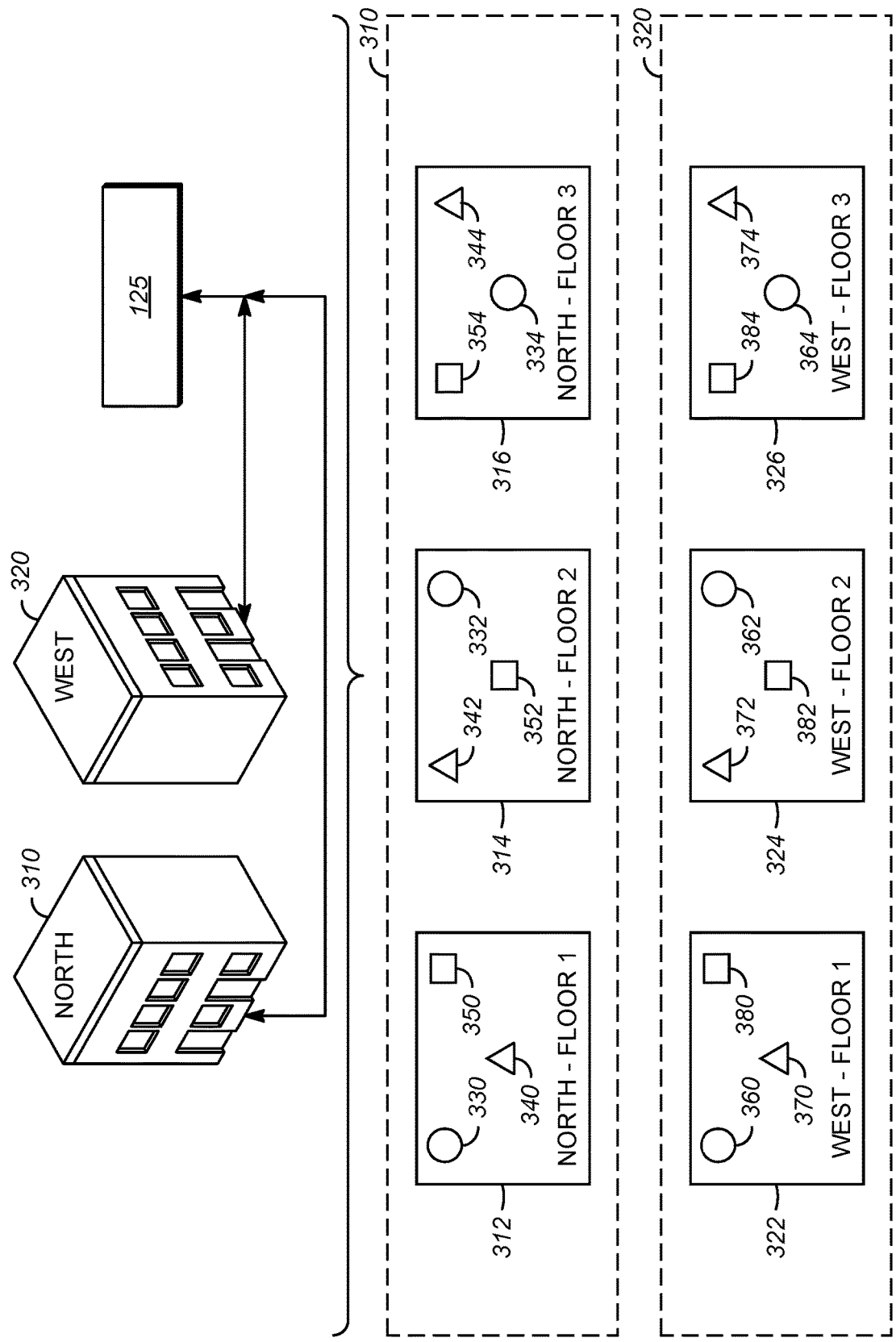
FIG. 3 illustrates a deployment of connected elements of a system for establishing and maintaining secure device communication, in accordance with one embodiment described herein.

FIG. 3 illustrates a deployment of various connected elements of a system for establishing and maintaining secure device communication in accordance with one embodiment described herein. A "North" building 310 and a "West" building 320 are illustrated. Each building has (3) floors associated with each. North Floor (1) 312, North Floor (2) 314, North Floor (3) 316 are contained within the North building 310. West Floor (1) 322, West Floor (2) 324, and West Floor (3) 326 are contained within the West building 320. Each floor has (3) connected elements of different types. For example, connected elements may be connected sensors to measure carbon dioxide 330, 332, 334, 360, 362, 364 for monitoring air quality of the building 310, 320 respectively and communicate via a wired network connection. Connected elements may be both a connected sensor to detect ambient light and an actuator 340, 342, 344, 370, 372, 374 to change the state of an occupant light fixture and communicate via a wired network connection. Connected elements may be connected sensors for temperature and humidity 350, 352, 354, 380, 382, 384 to monitor environment of the building 310, 320 respectively and communicate via a wireless network connection. As illustrated a secure device communication system 125 is connected to the system to establish and provide an ability to enroll devices of known or unknown trustworthiness into a system.

Figure 4:
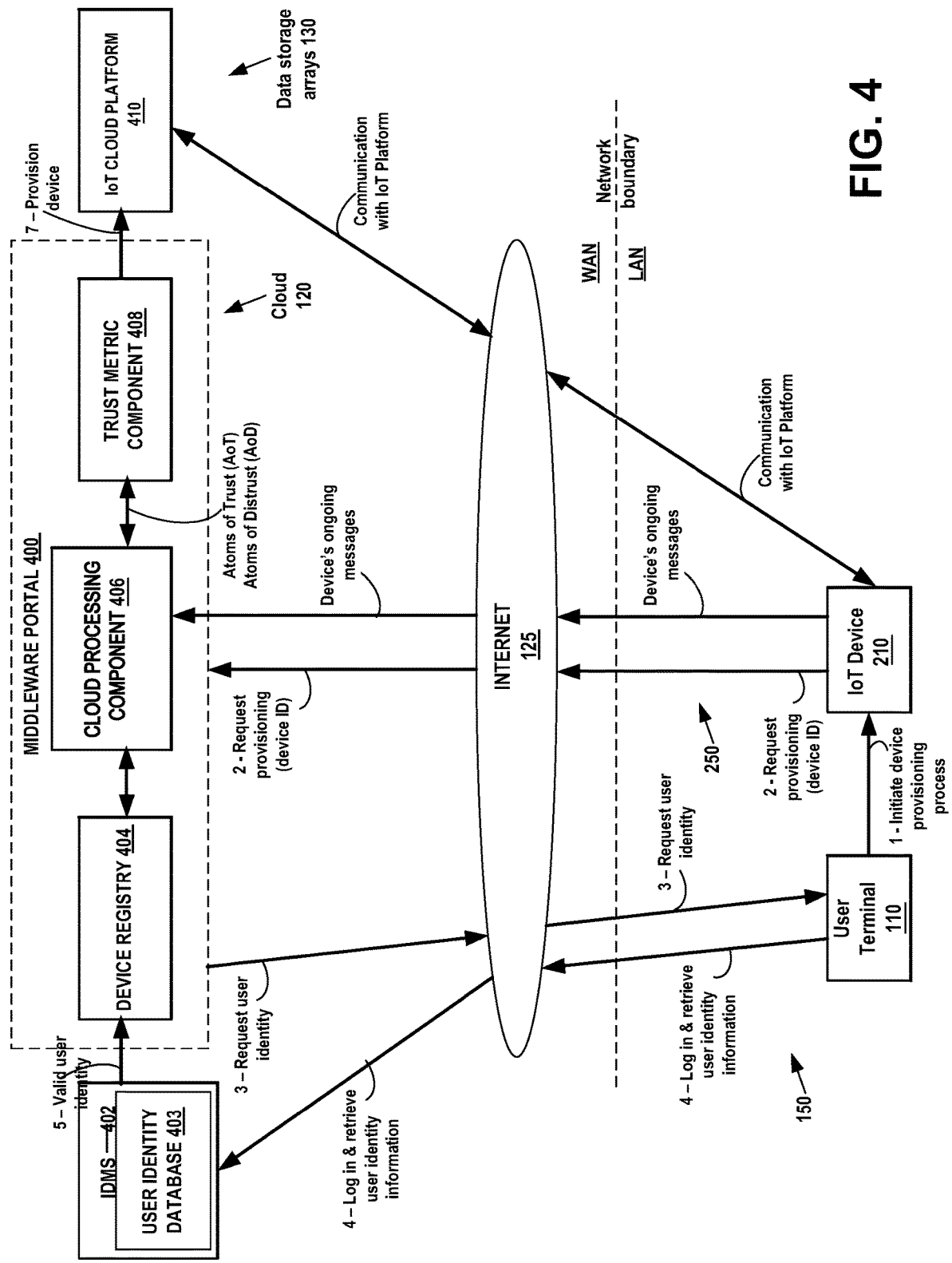
FIG. 4 is a block diagram illustrating a system for establishing and maintaining secure device communication, in accordance with one embodiment described herein.

FIG. 4 illustrates an example block diagram of a system 250 for establishing and maintaining secure device communication in accordance with various embodiments of the disclosure. Various embodiments of the disclosure may include a user to initiate a device provisioning process, a device which may request provisioning by a middleware portal which may validate one or more device characteristics, request user identification and/or characteristics, communicate with an IDMS or functionally similar identity provider to further validate a user identity with a middleware portal to provision with and communicate to the device to perform ongoing characterization and monitoring.

As shown, the system of FIG. 4 includes an integrated database management system (IDMS) 402 which manages a user identity database 403. The IDMS 402 is connected to a middleware portal 400. The middleware portal 400 includes a device registry 404, a cloud processing component cloud processing component 406 and a trust metric component 408. In the depicted example, a user can interact with user terminal 110 to initiate a device provisioning process for a new brownfield IoT device 210. Generally, the cloud processing component 406 provides a message bus along with computational logic. The IoT device 210 can transmit a message(s) over the Internet 125 to the cloud processing component 406, requesting provisioning and specifying the device ID of the IoT device 210. The cloud processing component 406 can then forward the provisioning request to the device registry 404, which in turn transmits a request for a user identity associated with the device registration to the user terminal 110. The user inputs login credential information to the user terminal 110, and this information is sent to the IDMS 402 managing the user identity database 403, which validates the login credential information. Upon successfully authenticating the user, the IDMS 402 transmit an indication to the device registry 404, indicating that the user is a valid user.

Generally, the cloud processing component 406 can collect event data relating to the behavior of the IoT device 210 during routine operation. For example, such event data can describe an amount of network traffic generated by the IoT device 210, the content of the network traffic generated by the IoT device 210, a timing schedule of actions performed by the IoT device 210, processing resource usage of the IoT device 210, storage resource usage of the IoT device 210, and so on. The cloud processing component 406 can generally compare the pattern of behavior observed for the IoT device 210 with an expected pattern of behavior for IoT devices of the same time. For example, such expected patterns of behavior can be generated from historical data collected from other IoT devices of the same type in a control environment (e.g., using devices that the manufacturer knows are authentic and operating normally). The cloud processing component 406 can generate atoms of trust (or, alternatively, atoms of distrust) based on the outcome of these comparisons. For example, if the cloud processing component 406 observes that the IoT device 210 is generating network traffic with substantially the same contents and quantity as historical devices of the same device type, the cloud processing component 406 could generate an atom of trust for the IoT device 210, indicating that the IoT device 210 is determined to be more trustworthy.

As another example, a manufacturer may implement a process in which serial numbers for devices are assigned to devices, and the cloud processing component 406 may be configured with logic for determining relationships between assigned serial numbers and device MAC addresses. For example, the cloud processing component 406 could access the IoT device's 210 serial number and MAC address and could validate the device's serial number using the logic and information relating to the serial number. For instance, the cloud processing component 406 could determine a time of manufacture for the device by performing a look-up operation in a data store using the device's MAC address, and the cloud processing component 406 could further access the data store (or a different data store) to determine a range of serial numbers assigned during a window of time (e.g., a week) including the data of manufacture. The cloud processing component 406 could then determine whether the assigned serial number for the device is within the determined range and could successfully validate the device if so. Upon validating the device's 210 serial number, the cloud processing component 406 could generate a corresponding atom of trust.

The cloud processing component 406 can generate a number of these atoms of trust (or distrust) for various attributes of the IoT device 210, and the trust metric component 408 can compile these atoms and compute an aggregate trust metric for IoT device 210. The trust metric component 408 can transmit the computed trust metric to the IoT cloud platform 410, which can store the trust metric in association with the IoT device 210. If the aggregate trust metric for the IoT device 210 indicates that the IoT device 210 is sufficiently trustworthy, the IoT cloud platform 410 can incorporate the IoT device 210 into the IoT platform. For example, the IoT cloud platform 410 could begin using data collected by the IoT device 210 in generating visualizations, events/alarms, and so on. The trust metric component 408 can continue to monitor the atoms of trust and atoms of distrust generated by the cloud processing component 406, and the trust metric component 408 can revoke the level of trust granted to the IoT device 210 if the IoT device 210 begins behaving abnormally and not in a manner consistent with other devices of the same device type. As such, while the brownfield IoT devices may never be given the same level of trust as greenfield IoT devices, embodiments can provide some level of trust to brownfield devices by monitoring their attributes and their behavior and can continue to update this level of trust in real-time, thereby allowing certain brownfield devices to operate within the cloud environment.

Figure 5:
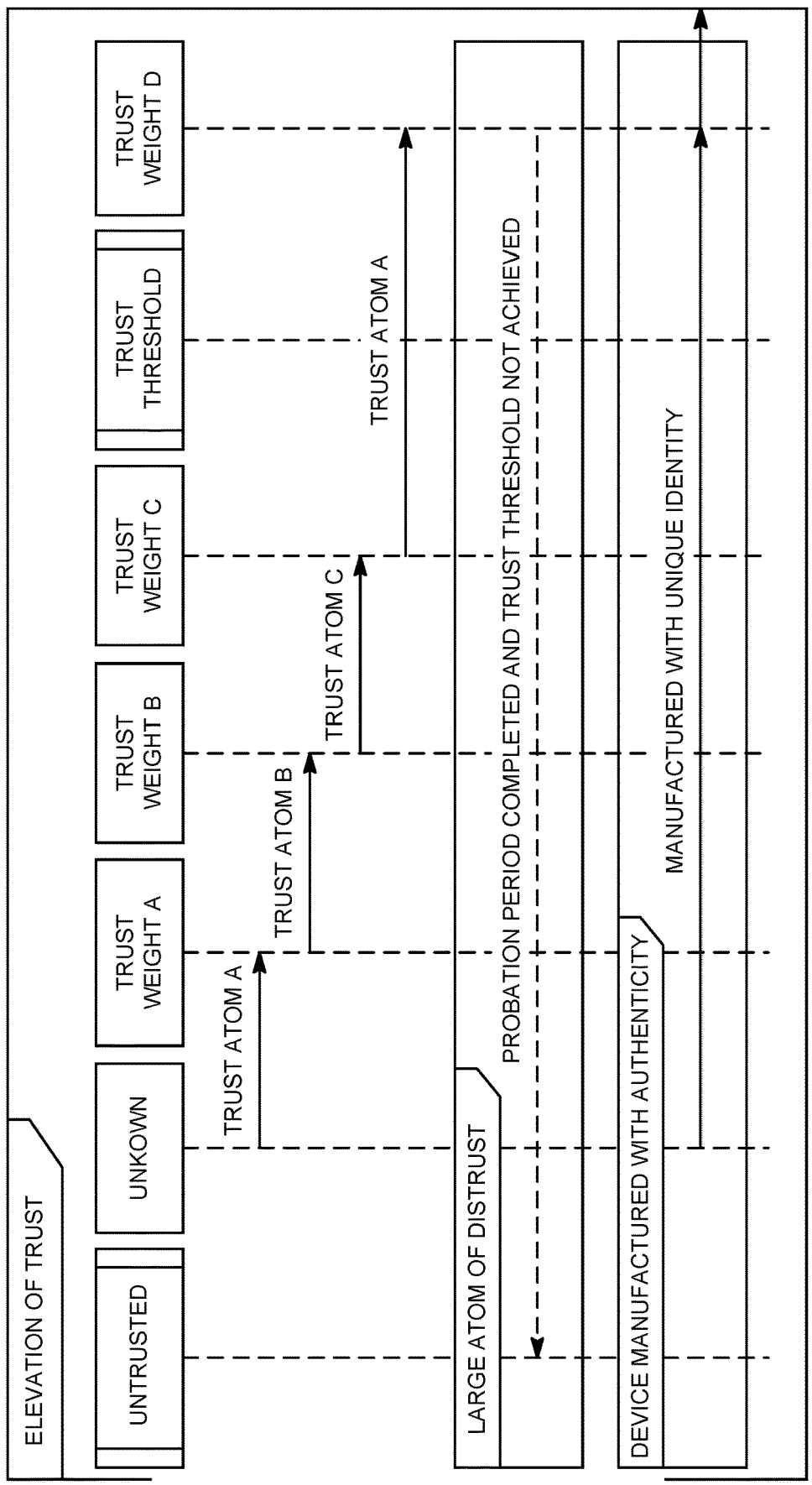
FIG. 5 illustrates incremental and decremental trust elements for establishing and maintaining secure device communication, in accordance with one embodiment described herein.

FIG. 5 illustrates embodiments of incremental and decremental trust elements for establishing and maintaining secure device communication. Atoms of Trust and Atoms of Distrust are utilized to determine the trustworthiness on a device by device basis. These Trust Elements are processed at a device level to create a Trust Metric. Once the trust metric is created, it is compared to a device level Trust Threshold. Based on that processing, further action may be taken by a security management device.

Devices that are provisioned utilizing embodiments of this innovation may be marked in their meta data in a device database with the method that they were provisioned. These methods may be brownfield, greenfield, or any other as defined by the authority responsible for provisioning devices. Such data may be immutable and may be utilized to enhance any filtering of devices such as to remove or identify devices that were provisioned through the brownfield process. This aspect may be beneficial to determine if one or a series of devices should be placed in a particular class of devices, such as unauthorized.

When a device is first provisioned in the system via a brownfield process it may be assumed that there is no level of trust of the device (0 trust weight). It should be appreciated this weighting is highly variable and configurable. A large degree of flexibility exists to allow a wide array of applications and retain the benefits of the innovation. As one embodiment, an Identity Provider service (in this example IDMS) identity verification may have a trust weight greater than 0. Requiring identity verification prior to enrollment would guarantee that provisioned devices will start with a specific initial weight of trust equal to the trust weight of identity verification (e.g., greater than 0).

Devices that have not reached a level of trust to be utilized by the system, such as those brownfield devices after initial provisioning, may be assigned a probationary state while it is determined if they have adequate trust. This probationary state may be utilized to further isolate questionable devices from the authorized and trusted devices of the platform. Once the trust threshold for a device has been achieved, the device may be moved to a fully operational state and removed from the probation state. During the probation period data collection may be disabled or other restrictions put in place to prevent harm to other devices, the network, and/or the need to move data at the end of probation.

As a device is deployed, various atoms of trust are accumulated and if sufficient trust weight is accumulated, the device will pass a trust threshold and be considered a trusted device in the system. Alternatively, if a device has not passed the trust threshold within the probationary period or other criteria as determined by the security system administrator, the device will be deemed un-trusted and de-provisioned or other action taken. Achieving trust threshold in a specified timer period may not be a concern for legitimate users utilizing real devices since normal operation should verify trust. However, it is a determent to an attacker since they would have to maintain an active attack for the duration of a probation period to gain full access to the system.

Generally, atoms of trust have several associated characteristics. It should be appreciated these are not exhaustive as other characteristics exist. Further, these characteristics may be combined with each other to create unique characteristics. For example, Atoms of Trust may have different weights, including negative values in the case of Atoms of Distrust. As another example, Atoms of Trust may be represented by integer Boolean or other data value types. In one embodiment, the sSize of each element may be defined by the weight of the AoT. In a particular embodiment, no single AoT may be earned by a brownfield device to gain trusted status, but rather a plurality of AoT are required before a trusted status can be earned. This may reduce the possibility of a single attack gaining access. It should be appreciated that devices that are manufactured with a verifiable manufacturing process (e.g., a serial number) have a high weight of trust and may be marked in their meta data with a flag indicated that they are manufactured with verifiable identity.

In one embodiment, the system can be configured such that a single AoD may outweigh all accumulated AoT, including devices that are already trusted. A large atom of distrust could be reserved for a device exhibiting a non-trusted behavior (e.g., transmitting data too frequently for an extended period of time). In such an embodiment, a device may be transitioned to a blacklisted state (from, e.g., an untrusted state, a probationally trusted state or a trusted state), based potentially on a single AoD.

Additionally, time can be a component to accumulating an AoT. For instance, trust atoms may accumulate weight during the probation period and if the trust threshold is reached during the probation period, the system may have some confidence that the device can be trusted. However, if a device does not reach the trust threshold within the probation period it may be removed from the system, requiring a user to re-register the device. Failed provision attempts may be recorded and counted, and if the count of attempted provisioning exceeds some threshold, the device may be blacklisted.

According to one embodiment, the system is configured to stop monitoring and assessing the trust state of devices once the devices are classified as blacklisted, as the system may not remove the blacklisted state regardless of the amount of expected behavior from the blacklisted devices once blacklisted. In one embodiment, the system is configured to altogether stop communications with blacklisted devices and to ignore any network messages sent from the blacklisted devices. As another example, the system could be configured to purge all data previously received from or otherwise collected for the blacklisted devices. In one embodiment, the system is configured to implement a process through which devices can be removed from the blacklisted state. For example, such a process could involve calling in to customer support to validate the authenticity of the device, having a technician visit the customer site to validate the authenticity of the device and so on.

One rationale for deleting a device that does not reach trust threshold in probation time is that a legitimate user would connect a device to the system and it should accumulate sufficient trust during probation period. One explanation for not completing such trust would be that the device is not connected during the interval OR it is a malicious device. For a malicious user to satisfy this threshold and time requirement would entail committing significant resources over a duration of time (e.g., attempting to use an emulator to create multiple invalid device identities), thus increasing the cost of the attack. This resource cost is not a problem for a legitimate user, since they have the valid physical device which would send appropriate data during the probationary period.

Atom weights may be scored in a variety of ways. One example may be the smallest and easiest achieved atom having a weight of 1. All other atoms are scored relative to this smallest atom. This disclosure contemplates several factors relative to the scoring of atoms that may be used to further weight the atoms. They include, but are not limited to, atoms that are difficult to discover, such as serial numbers; atoms that re difficult to automate, such as interactions that require a human in the loop; and difficult to falsify, such as any atom that is very difficult to replicate, such as a "salt" code.

When creating the atoms of trust and their respective weights, an important consideration is the relative cost and difficulty to generate an AoT. For example, an AoT that relies on the device to perform its normal operation is inexpensive for the device to execute, but expensive for an attacker to generate, which may be a valuable AoT. An AoT that requires compute power on a platform to validate, and compute power for an attacker, may have medium value. An AoT that requires more compute power to validate than to generate may be low value.

Following are examples of various AoTs. Determining the weight of atoms is a highly flexible process that is dependent on the application. Each atom may have 2 values, a positive value that is earned for possessing the atom, and a negative value if an atom is known not to be true. Atoms may be initially assigned values as determined by the system.

Atoms that possess a very large distrust score may make any trusted item untrusted and cause it to be black-listed from future communications. Atoms of very large trust may indicate a reliable and robust process which indicates that further trust is not required.

Atoms of trust may have a binary weight (e.g., it either possesses or does not possess the trust element) or may have integer weight reflecting the amount of this trust atom that has been accumulated. Some atoms of trust may have a pass/fail weight, indicating if they pass a test there is positive trust weight, and failing a test has an associated negative weight. Generally, failing a test is more negative than passing a test since malicious users are attempting to pass a test.

IDMS validation may have low atomic weight and may be based on the following characteristics. As with any AoT it may be required for provisioning a device based on the system defined requirements. IDMS has CAPTCHA portal to prevent brute force attack, IDMS requires email verification before account is activated, and/or Multi-Factor Authentication (MFA). Further qualifiers may be included to these characteristics, such as CAPTCHA requires human to create an account, a unique email address, and/or MFA requires a second source of verification by a human.

MAC/Serial number combination validation of network interface may have a low AoT and a very high AoD. A user may use a website application to take a picture of the bar code on a device which will read the MAC address, serial number and SKU Number. This information may be compared against manufacturing records. Validation may be performed to prevent duplicate MAC/Serial Number combinations. If a duplicate MAC address or serial number is detected, a duplicate identifier atom method is provided herein. Furthermore, attacker may also infer from product labels the correct relationship between MAC and Serial number, and thus become able to guess hitherto-unseen Mac/Serial combinations.

Serial Number/SKU number of host system may have a low AoT and a very high AoD. A user will use a website application to take a picture of the bar code of the device is installed in. This information is transmitted to the cloud and may be validated against user entry. Data in the message packet may only be retrieved by a valid device. If a duplicate MAC address or serial number is detected, a duplicate identifier atom method is provided herein.

In the case of a UPS in use, validate UPS data against other data items may have a low AoT and a very high AoD. In some manufacturing processes there is a mathematic correlation between serial number and date of manufacture. If the manufacture date does not match within tolerance the calculation it would be a high AoD. There is a known relationship that bounds the manufacturing date of the UPS. UPS serial number can be used to determine the SKU number via Manufacturing Execution System (MES) database retrieval and comparison from value reported by device. Validation exists to prevent duplicate UPS serial numbers from being registered by identifying units with multiple registrations.

In the case of a UPS in use, a user required to perform Self-test from front panel of the unit may have a low AoT and a very high AoD. A user will be instructed to perform action to the UPS and will be required to perform the operation within certain time period of the request. A user will use the local interface of the UPS to cause the UPS to check the battery health. A response to this action will be a characteristic set of messages with specific values in various locations.

Communication pattern validation may have a low AoT and a low AoD. Monitoring incoming messages and tracking the rate of arrival (e.g., messages received over a period of time) and comparing to expected rate of traffic increase the trust level. This AoT may have multiple values that increase over time not necessarily linear. When exceeding communication rate limits the distrust level may increase This atom of distrust may continually accumulate during probation period, if exceeding a specified threshold, it may become a large item of distrust.

As an example, all telemetry data from devices is sent to an event hub and a stream analytic job would measure time between messages. If time between messages is, for example, 5 minutes+/−20 seconds, an AoT may be gained. If not in that range, 1 will be subtracted. In such a case, if 85% of messages pass the time between message test, the device is trusted. If during the probation period if the threshold is missed, the device is untrusted. Threshold can assume device is operating for 1 week, or any other appropriate time metric, so missing more than 25 intervals means the device is not connected continually.

Message content unit to verify that sequence numbers and statistical timers in the data are increasing as expected may have a low AoT and a high AoD. As an example, all telemetry data needs to go through protocol translation and key, value pairs are interrogated using stream analytic processes. For example, the stream analytic process could validate the data based on knowledge that sequence numbers should increase, and process counters and timer(s) should change appropriately (e.g., move up, move down or stay constant based on the property being measured).

Statistical validation of physical telemetry unit may have a low AoT and a high AoD. For instance, on-board battery voltage or other measurements have a particular statistical distribution over time. As an example, a given metric value on a device may be expected to vary over time. As such, if the system determines that a device is reporting the same value for the given metric over a length of time, the system could determine this is indicative of an untrustworthy device (e.g., a counterfeit or malicious device) and could generate an atom of distrust accordingly. More generally, embodiments can consider known limitations of devices of a given device type in ascertaining whether individual devices are behaving in an expected manner.

Duplicate Identifier, such as a serial number or MAC address detection may have a low AoD. A duplicate MAC address or Serial Number may exist either by manufacturing defect, or a malicious actor "inventing" a MAC address or Serial Number as a DoS. As the actual (i.e., non-counterfeit device) cannot be determined, ALL devices with the duplicate may accumulate an atom of distrust. If one of the duplicates is already trusted, then it need not accumulate the atom of distrust as it is assumed to have performed properly for an extended period of time ensures that it is the real one. In such as case the newly attempted device may be distrusted and would have a high weight of distrust. As another possible variation, a single user having multiple duplicate MAC addresses is likely a malicious actor, and all devices associated to that user may be disabled.

Message Content check may have a high AoD. This characteristic, each message must contain an expected number of data items as determined by the system. If a message is not sufficiently "different" than previous messages it may accumulate distrust atom.

In one embodiment, the system can conduct stimulus-response testing for a device to generate atoms of trust or distrust. For example, the system can generate an occurrence of a stimulus event for the device and can monitor the device's behavior to determine how the device responds to the stimulus event. If the device responds in the expected way and in an expected amount of time, the system could generate an atom of trust for the device; likewise, if the device responds in a manner that is unexpected and/or does not respond in a period of time consistent with the device's type (e.g., in a period of time determining by analyzing historical performance data collected from other devices of the device's type in a control environment). Examples of stimulus events include, without limitation, network messages transmitted to the first device, predefined sensor data transmitted to the first device, and manually causing a physical event of a first physical event type to occur (e.g., manually turning on a physical light switch or pushing a physical button), where the first device is configured to monitor for occurrences of events of the first physical event type.

Figure 6A:
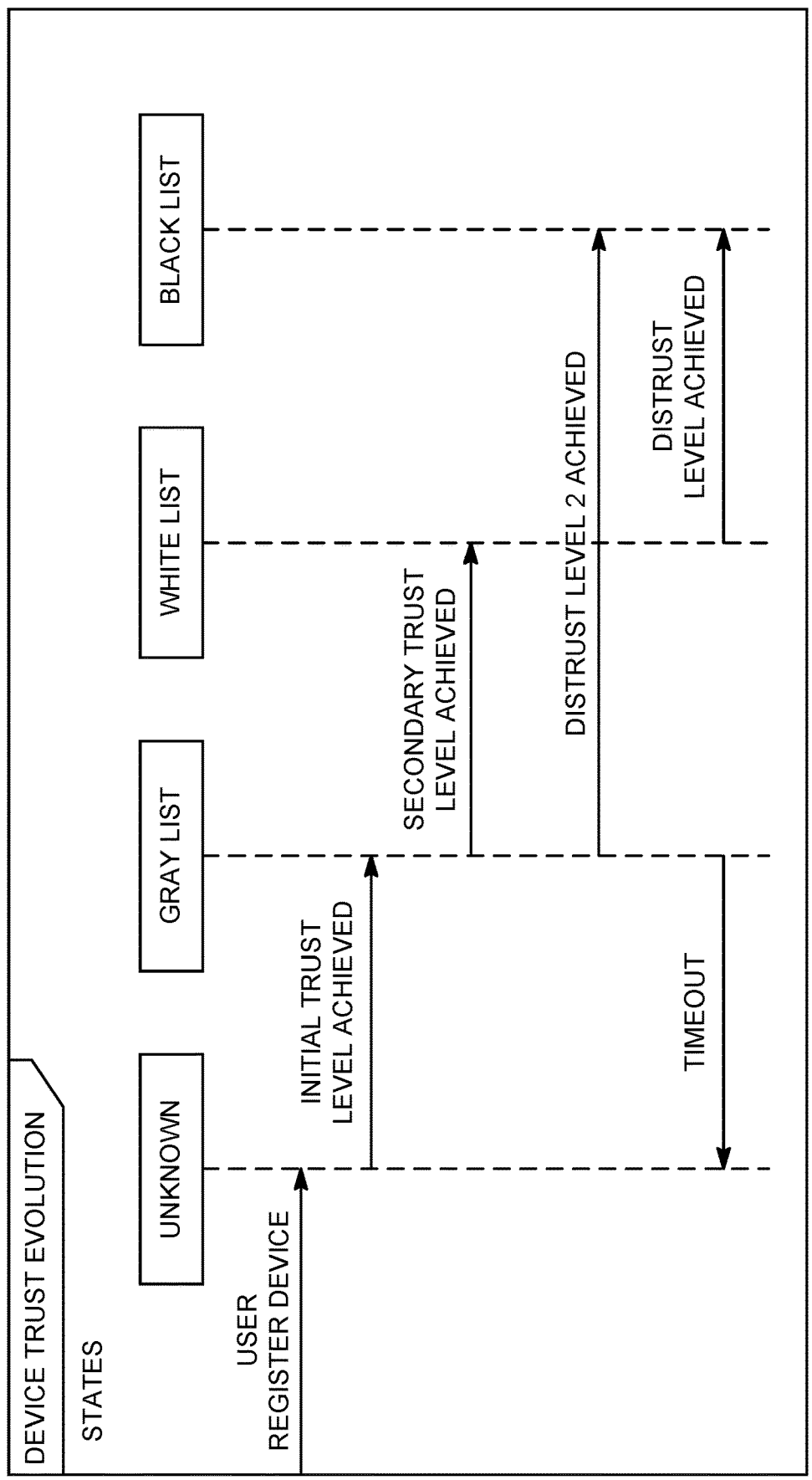
FIG. 6A illustrates a state diagram for trust state evolution elements for establishing and maintaining secure device communication, in accordance with one embodiment described herein.
Figure 6B:
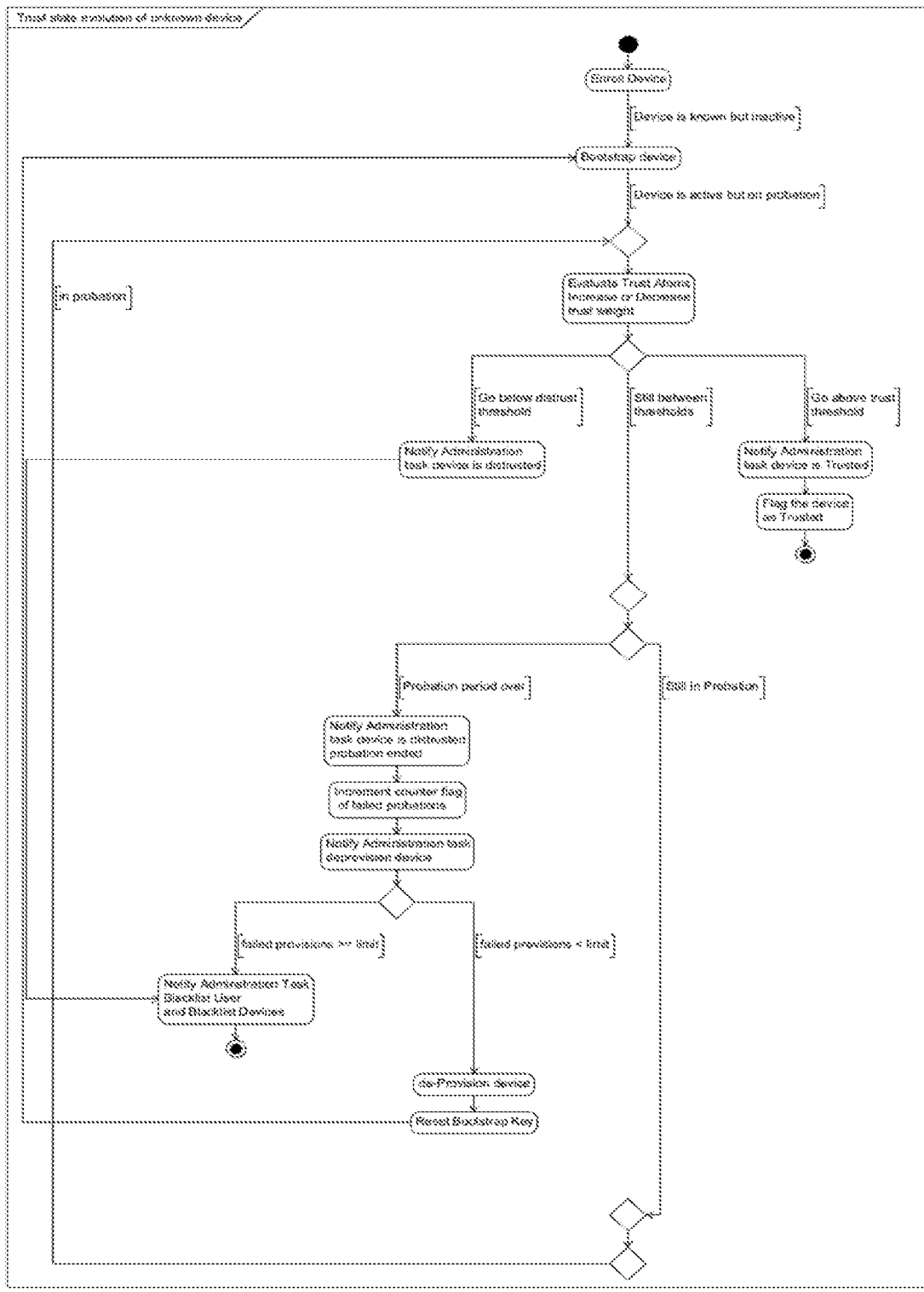
FIG. 6B illustrates a flow diagram for a trust state evolution process for establishing and maintaining secure device communication, in accordance with one embodiment described herein.
Figure 6C:
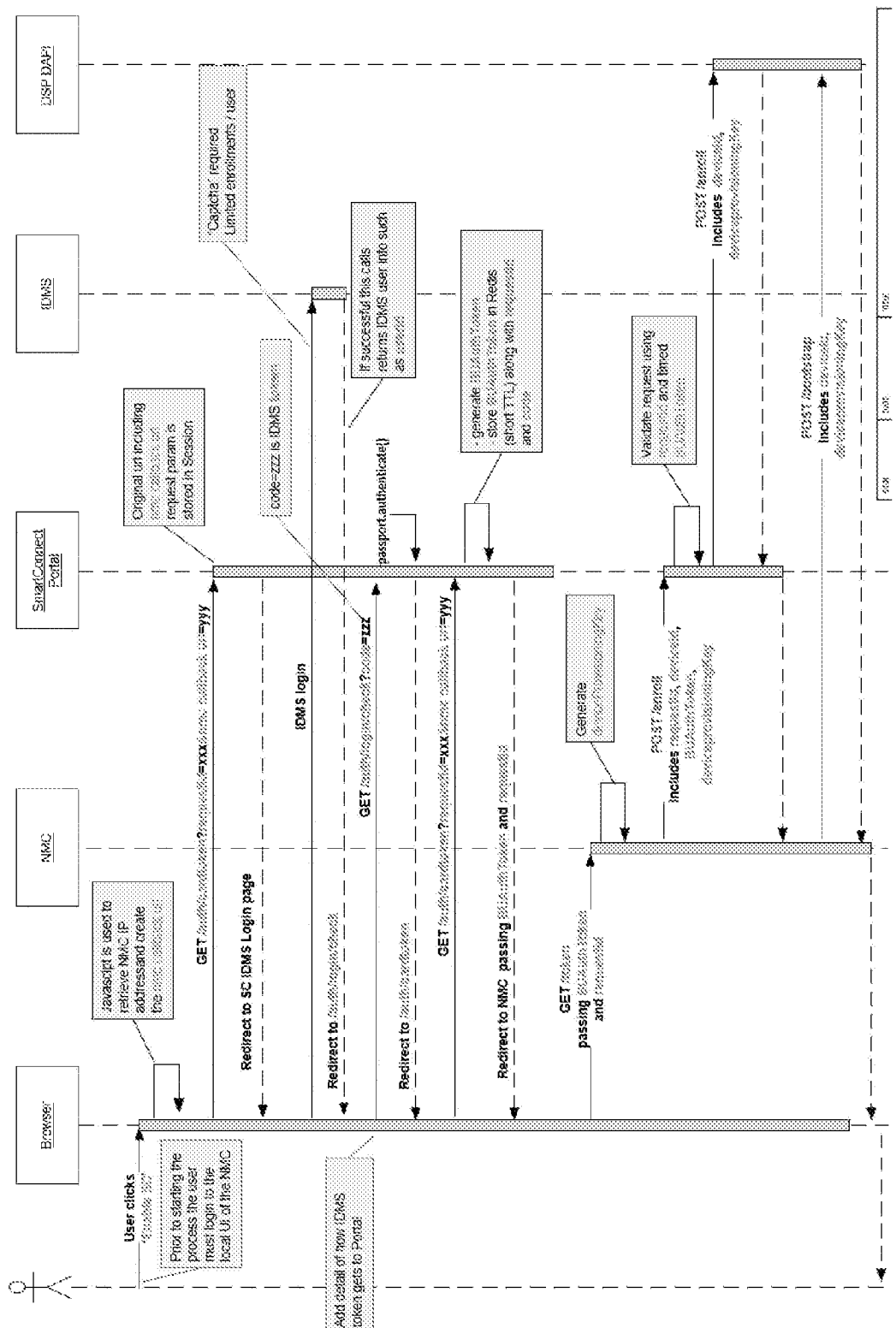
FIG. 6C illustrates a sequence diagram for provisioning devices in a system for establishing and maintaining secure device communication, in accordance with one embodiment described herein.

FIGS. 6A, 6B, and 6C illustrates embodiments of state, flow, and sequence diagrams for trust state evolution of embodiments for establishing and maintaining secure device communication. A process of establishing or maintaining a secure device connection begins with a device or receiving an enrollment request message. When a device is provisioned with the brownfield provisioning service it may start with a trust weight of zero. Each AoT that is gained will increase the trust weight by the weight of the AoT. Some AoT are binary (exist or don't exist) while others have integer values that change weight over time. There may be a probation period that if a device from provisioning to end of probation has not reached a trust threshold it is assumed to be distrusted and removed from the system (de-provisioned and de-enrolled). If a device is removed from the system, the entire enrollment and probation process may be repeated; however, the number of such permitted repetitions may be limited (e.g., 3 attempts before the device is permanently blacklisted). Since requiring a device that does not complete trust in the prescribed time makes it more challenging to create a "latent" army of devices that accumulate trust slowly. A user that has a device removed from trust will gain an atom of distrust as it is potentially a malicious user, a user with a high distrust will not be allowed to enroll devices. If a device "earns" a large distrust score the device will be blacklisted, if the device is a brownfield device it will also blacklist other devices owned by the user.

Any general-purpose computer systems used in various embodiments of this disclosure may be, for example, general-purpose computers such as those based on Intel PENTIUM-type processor, Motorola PowerPC, Sun UltraSPARC, Hewlett-Packard PA-RISC processors, or any other type of processor.

Figure 7:
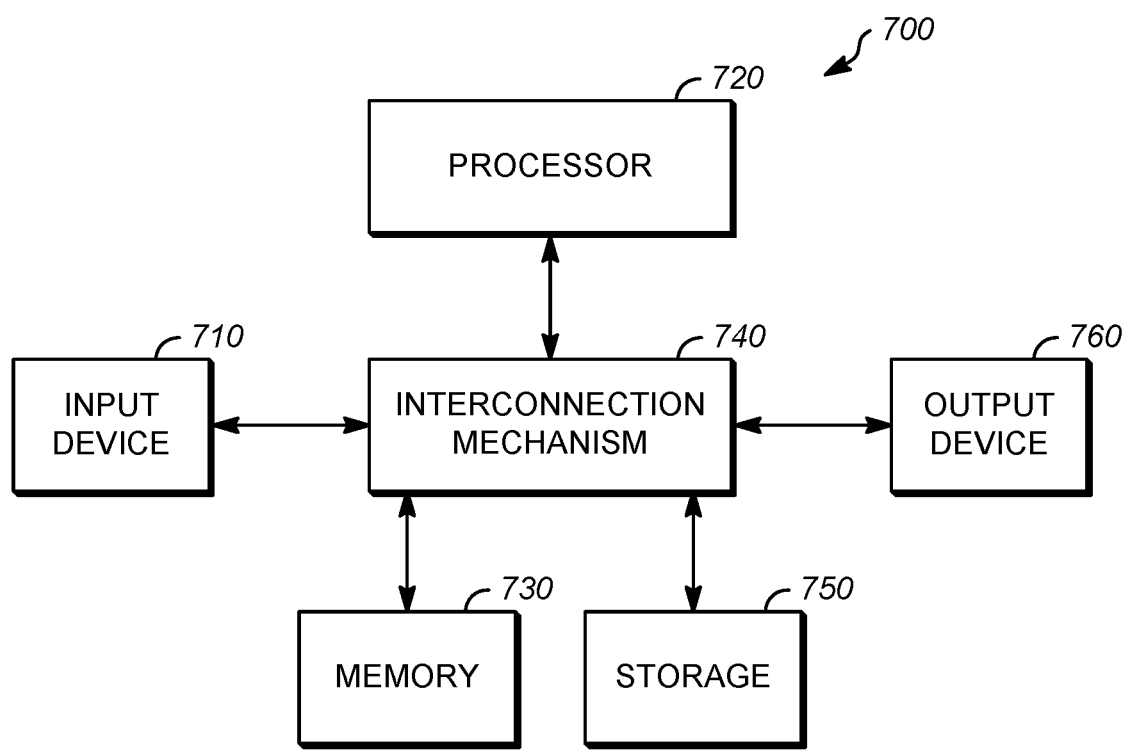
FIG. 7 illustrates a functional block diagram of a general-purpose computer system, in accordance with one embodiment described herein.

For example, various embodiments of the disclosure may be implemented as specialized software executing in a general-purpose computer system 700 such as that shown in FIG. 7. The computer system 700 may include a processor 720 connected to one or more memory devices 730, such as a disk drive, memory, or other device for storing data. Memory 730 is typically used for storing programs and data during operation of the computer system 700. The computer system 700 may also include a storage system 750 that provides additional storage capacity. Components of computer system 700 may be coupled by an interconnection mechanism 740, which may include one or more busses (e.g., between components that are integrated within the same machine) and/or a network (e.g., between components that reside on separate discrete machines). The interconnection mechanism 740 enables communications (e.g., data, instructions) to be exchanged between system components of system 700.

Computer system 700 also includes one or more input devices 710, for example, a keyboard, mouse, trackball, microphone, touch screen, and one or more output devices 760, for example, a printing device, display screen, speaker. In addition, computer system 700 may contain one or more interfaces (not shown) that connect computer system 700 to a communication network (in addition or as an alternative to the interconnection mechanism 740).

Figure 8:
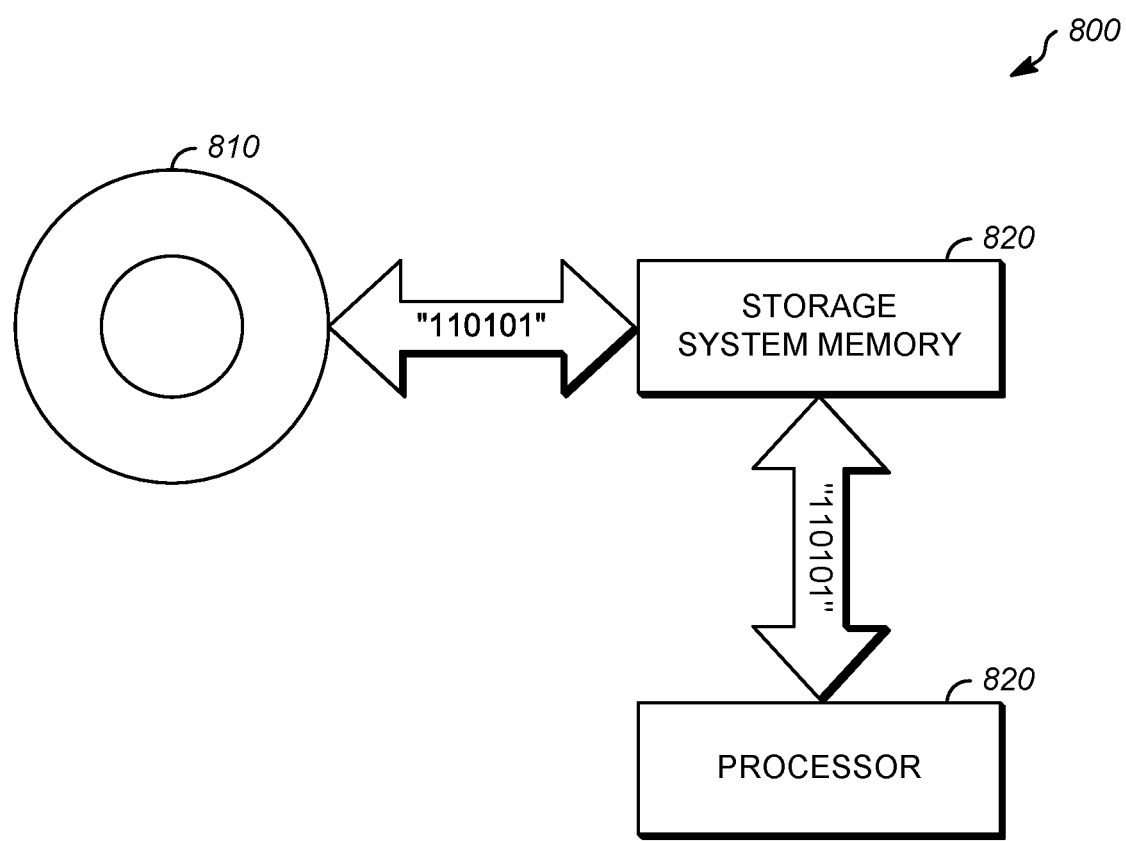
FIG. 8 illustrates a functional block diagram of a general-purpose storage system for use with a general-purpose computer system, in accordance with one embodiment described herein.

The storage system 750, shown in greater detail in FIG. 8, typically includes a computer readable and writeable nonvolatile recording medium 810 in which signals are stored that define a program to be executed by the processor or information stored on or in the medium 810 to be processed by the program to perform one or more functions associated with embodiments described herein. The medium may, for example, be a disk or flash memory. Typically, in operation, the processor causes data to be read from the nonvolatile recording medium 810 into another memory 820 that allows for faster access to the information by the processor than does the medium 810. This memory 820 is typically a volatile, random access memory such as a dynamic random-access memory (DRAM) or static memory (SRAM). It may be located in storage system 800, as shown, or in memory system 730. The processor 720 generally manipulates the data within the integrated circuit memory 730, 820 and then copies the data to the medium 810 after processing is completed. A variety of mechanisms are known for managing data movement between the medium 810 and the integrated circuit memory element 730, 820, and the disclosure is not limited thereto. The disclosure is not limited to a particular memory system 730 or storage system 750.

The computer system may include specially-programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the computer system described above or as an independent component.

Although computer system 700 is shown by way of example as one type of computer system upon which various aspects of the disclosure may be practiced, it should be appreciated that aspects of the disclosure are not limited to being implemented on the computer system as shown in FIG. 8. Various aspects of the disclosure may be practiced on one or more computers having a different architecture or components shown in FIG. 8. Further, where functions or processes of embodiments of the disclosure are described herein (or in the claims) as being performed on a processor or controller, such description is intended to include systems that use more than one processor or controller to perform the functions.

Computer system 700 may be a general-purpose computer system that is programmable using a high-level computer programming language. Computer system 700 may be also implemented using specially programmed, special purpose hardware. In computer system 700, processor 720 is typically a commercially available processor such as the well-known Pentium class processor available from the Intel Corporation. Many other processors are available. Such a processor usually executes an operating system which may be, for example, the Windows 95, Windows 98, Windows NT, Windows 2000, Windows ME, Windows XP, Vista, Windows 7, Windows 10, or progeny operating systems available from the Microsoft Corporation, MAC OS System X, or progeny operating system available from Apple Computer, the Solaris operating system available from Sun Microsystems, UNIX, Linux (any distribution), or progeny operating systems available from various sources. Many other operating systems may be used.

The processor and operating system together define a computer platform for which application programs in high-level programming languages are written. It should be understood that embodiments of the disclosure are not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

It should be appreciated that the disclosure is not limited to executing on any particular system or group of systems. Also, it should be appreciated that the disclosure is not limited to any particular distributed architecture, network, or communication protocol.

Figure 9:
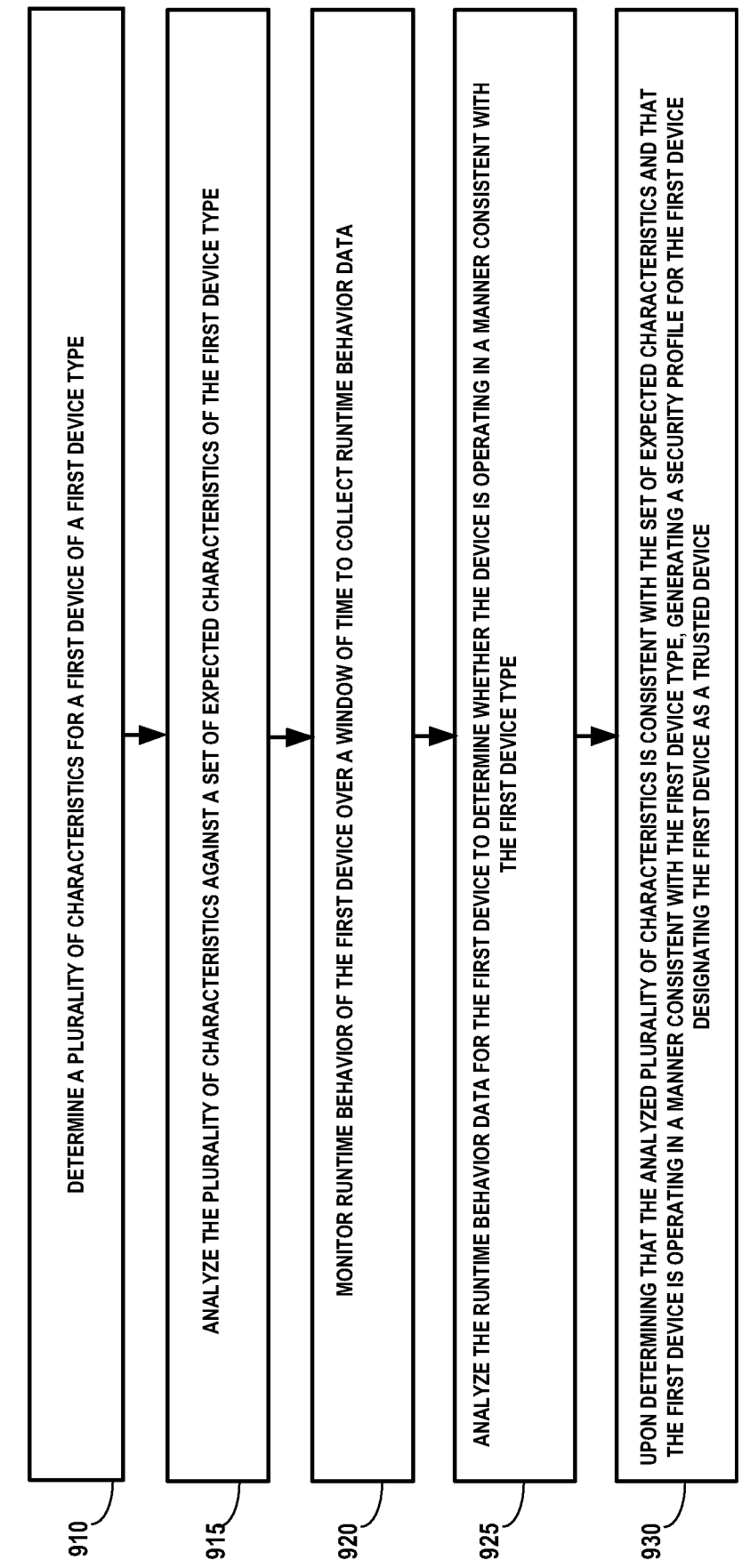
FIG. 9 is a flow diagram illustrating a method for generating a security profile for a device, in accordance with one embodiment described herein.

FIG. 9 is a flow diagram illustrating a method for generating a security profile for a device, in accordance with one embodiment described herein. As shown, the method 900 begins at block 910, where the middleware portal 400 determines a plurality of characteristics for a first device of a first device type. The middleware portal 400 analyzes the plurality of characteristics against a set of expected characteristics of the first device type (block 915). Additionally, the middleware portal 400 monitors runtime behavior of the first device over a window of time to collect runtime behavior data for the first device (block 920). The middleware portal 400 analyzes the runtime behavior data for the first device to determine whether the device is operating in a manner consistent with the first device type (block 925). Upon determining that the analyzed plurality of characteristics is consistent with the set of expected characteristics and that the first device is operating in a manner consistent with the first device type, the middleware portal 400 generates a security profile for the first device designating the first device as a trust device (block 930), and the method 900 ends.

Figure 10:
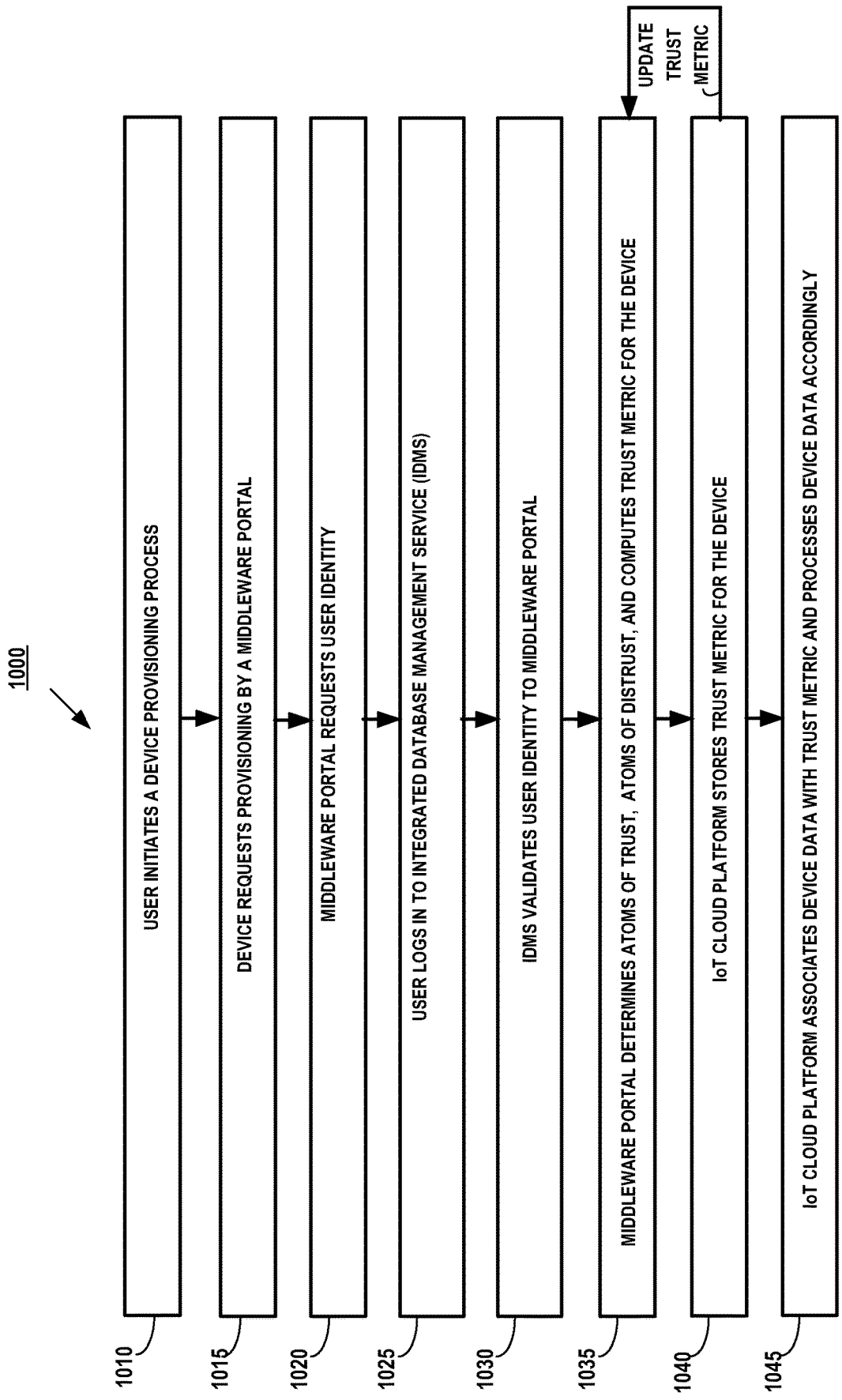
FIG. 10 is a flow diagram illustrating a method for computing and associating a trust metric with a device, in accordance with one embodiment described herein.

FIG. 10 is a flow diagram illustrating a method for computing and associating a trust metric with a device, in accordance with one embodiment described herein. As shown, the method 1000 begins at block 1010, where a user initiates a device provisioning process via a user terminal. The device requests provisioning from a middleware portal (block 1015). The middleware portal requests user identity information from the user (block 1020), and the user logs in to an IDMS using login credential information (block 1025). The IDMS validates the identity of the user and transmits an indication confirming the validity of the user's identity to the middleware portal (block 1030). The middleware portal determines atoms of trust and atoms of distrust for the device and computes an aggregate trust metric for the device (block 1035). The IoT cloud platform stores the trust metric for the device (block 1040). As shown, blocks 1035 and 1040 can be repeated, as the middleware portal continues to monitor the device's real-time behavior and attributes and continues to update the atoms and aggregate trust metric for the device. At block 1045, the IoT cloud platform associates device data collected by the device with the trust metric and processes the device data accordingly. For example, if the aggregate trust metric indicates that the device is determined to be a trustworthy device, the IoT cloud platform may treat data collected by the IoT device in substantially the same fashion as data collected by authenticated greenfield devices. As another, example, if the aggregate trust metric indicates that the device is behaving abnormally or is otherwise determined to be untrustworthy, the IoT cloud platform could flag data collected by the device as untrustworthy and could exclude this data from visualizations, events, alarms and the like generated by the IoT cloud platform. Of course, such examples are provided for illustrative purposes only, and more generally it is contemplated that any suitable action associated with a trustworthy device or an untrustworthy device within an IoT system can be performed by the IoT cloud platform, consistent with the functionality described herein.

Figure 11:
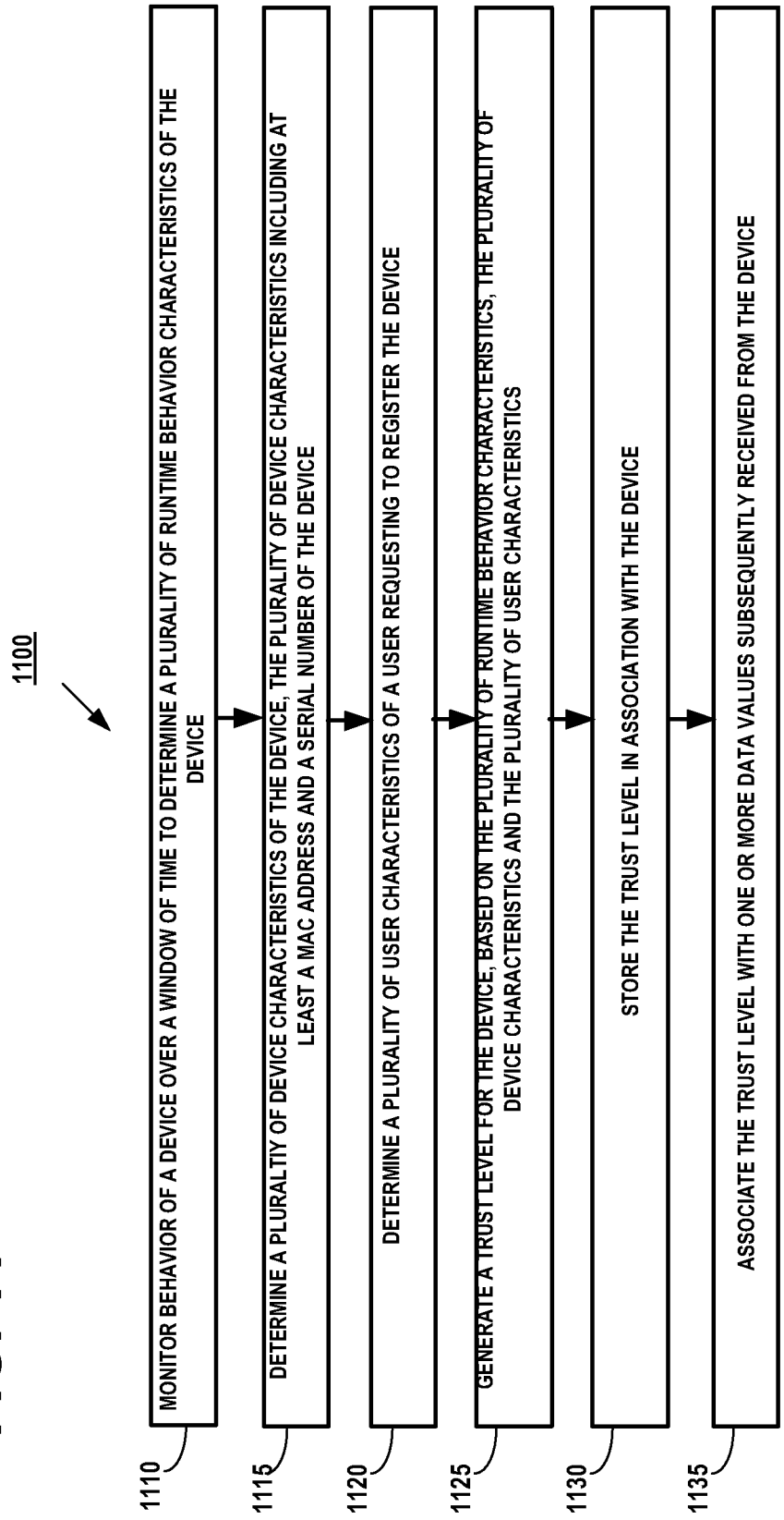
FIG. 11 is a flow diagram illustrating a method for generating and associating a trust level metric with a device, in accordance with one embodiment described herein.

FIG. 11 is a flow diagram illustrating a method for generating and associating a trust level metric with a device, in accordance with one embodiment described herein. As shown, the method 1100 begins at block 1110, where the middleware portal monitors behavior of a device over a window of time to determine a plurality of runtime behavior characteristics of the device. The middleware portal determines a plurality of device characteristics of the device, including at least a MAC address and a serial number of the device (block 1115). The middleware portal additionally determines a plurality of user characteristics of a user requesting to register the device with the IoT system (block 1120).

The middleware portal generates a trust level for the device, based at least in part on the plurality of runtime behavior characteristics, the plurality of device characteristics and the plurality of user characteristics (block 1125). The middleware portal stores the trust level in association with the device (block 1130) and associates the trust level with one or more data values subsequently received from the device (block 1135).

Various embodiments of the present disclosure may be programmed using an object-oriented programming language, such as SmallTalk, Java, C++, Ada, or C# (C-Sharp). Other object-oriented programming languages may also be used. Alternatively, functional, scripting, and/or logical programming languages may be used, such as BASIC, ForTran, COBoL, TCL, or Lua. Various aspects of the disclosure may be implemented in a non-programmed environment (e.g., documents created in HTML, XML or other format that, when viewed in a window of a browser program render aspects of a graphical-user interface (GUI) or perform other functions). Various aspects of the disclosure may be implemented as programmed or non-programmed elements, or any combination thereof.

Embodiments of a systems and methods described above are generally described for use in relatively large data centers having numerous equipment racks; however, embodiments of the disclosure may also be used with smaller data centers and with facilities other than data centers. Some embodiments may also be a very small number of computers distributed geographically so as to not resemble a particular architecture.

In embodiments of the present disclosure discussed above, results of analyses are described as being provided in real-time. As understood by those skilled in the art, the use of the term real-time is not meant to suggest that the results are available immediately, but rather, are available quickly giving a designer the ability to try a number of different designs over a short period of time, such as a matter of minutes.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A method performed by a communication portal to establish and/or maintain secure communication, comprising:
   determining a plurality of characteristics for a first device of a first device type;
   analyzing the plurality of characteristics against a set of expected characteristics of the first device type, comprising:
      generating an occurrence of a stimulus event for the first device; and
      monitoring behavior of the first device responsive to the stimulus event and timing of the behavior,
   monitoring runtime behavior of the first device over a window of time to collect runtime behavior data;

analyzing the runtime behavior data for the first device to determine whether the first device is operating in a manner consistent with the first device type, comprising determining whether the behavior and the timing of the behavior of the first device are consistent with the first device type; and upon determining that the analyzed plurality of characteristics is consistent with the set of expected characteristics and that the first device is operating in a manner consistent with the first device type, generating a security profile for the first device designating the first device as a trusted device.

2. The method of claim 1, wherein monitoring runtime behavior of the first device over a window of time the collect runtime behavior data further comprises:

monitoring network traffic generated by the first device on a data communications network, wherein analyzing the runtime behavior data for the first device further comprises determining whether the network traffic generated by the first device is consistent in quantity and composition with the first device type.

3. The method of claim 1, wherein determining the plurality of characteristics for the first device of the first device type further comprises:

retrieving manufacturing data relating to a first characteristic of the plurality of characteristics for the first device, and wherein analyzing the plurality of characteristics against the set of expected characteristics of the first device type further comprises:

validating a second characteristic of the plurality of characteristics, using the retrieved manufacturing data and predefined logic correlating the manufacturing data and the second characteristic.

4. The method of claim 3, wherein retrieving manufacturing data relating to the first characteristic of the plurality of characteristics for the first device further comprises:

determining a media access control (MAC) address of the first device;

determining a window of time during which the first device was manufactured, by querying a data store using at least the MAC address of the first device; and determining a range of serial numbers assigned to devices during the window of time, wherein validating the second characteristic of the plurality of characteristics further comprises:

validating a serial number assigned to the first device by determining whether the serial number is within the range of serial numbers assigned to devices during the window of time.

5. The method of claim 1, wherein monitoring runtime behavior of the first device over the window of time to collect the runtime behavior data further comprises:

monitoring computing resources used on the first device during the window of time, wherein the computing resources include at least one of processor resources and memory resources, wherein analyzing the runtime behavior data for the first device further comprises determining whether the computing resources used by the first device are consistent with historical computing resource usage of devices of the first device type, and wherein monitoring runtime behavior of the first device over a window of time the collect runtime behavior data is performed once the first device has reached a probationally trusted or fully trusted state.

6. The method of claim 1, wherein generating the security profile for the first device designating the first device as the trusted device further comprises:

transitioning from a first trust level of the first device to a second trust level of the first device using predefined state transition logic, wherein the first and second trust levels are selected from a predefined plurality of trust levels.

7. The method of claim 6, further comprising:

while the first device is assigned the second trust level, receiving one or more data records collected by the first device over a data communications network;

associating an indication of the assigned second trust level with the one or more data records; and processing the one or more data records, based at least in part on the associated indication of the assigned second trust level.

8. The method of claim 7, wherein processing the one or more data records further comprises at least one of:

storing the one or more data records together with the associated indication of the assigned second trust level; and taking a predefined action based on one or more data values within the one or more data records and the associated indication of the assigned second trust level.

9. The method of claim 8, wherein taking the predefined action comprises at least one of (i) generating an automated alert based on the one or more data values satisfying one or more predefined conditions and (ii) incorporating the one or more data values into a data model based on the corresponding assigned trust level exceeding a predefined minimum trust threshold.

10. The method of claim 6, wherein the predefined plurality of trust levels includes at least an untrusted level, a trusted level, a probationally trusted level and a blacklisted level.

11. The method of claim 10, further comprising:

determining a second plurality of characteristics for the first device of the first device type;

analyzing the second plurality of characteristics against the set of expected characteristics of the first device type;

monitoring subsequent runtime behavior of the first device over a second window of time to collect second runtime behavior data;

analyzing the second runtime behavior data for the first device to determine whether the first device is operating in the manner consistent with the first device type; and upon determining that at least (i) one or more of the analyzed plurality of characteristics are not consistent with the set of expected characteristics and (ii) the first device is operating in a manner inconsistent with the first device type:

generating a second security profile for the first device designating the first device as a blacklisted device.

12. The method of claim 1, wherein generating the occurrence of the stimulus event further comprises at least one of (i) transmitting a network message to the first device, (ii) transmitting predefined sensor data to the first device, and (iii) manually causing a physical event of a first physical event type to occur, wherein the first device is configured to monitor for occurrences of events of the first physical event type.

13. The method of claim 12, wherein determining whether the behavior and the timing of the behavior of the first device are consistent with the first device type further comprises:

determining one or more expected responses of the first device, based on an expected pattern of behavior of devices of the first device type;
determining a timing schedule of the one or more expected responses, based on the expected pattern of behavior; and
determining, based on the monitored behavior of the first device, whether the one or more expected responses were performed according to the time schedule.

14. The method of claim 1, wherein determining a plurality of characteristics for the first device of the first device type further comprises:
determining a media access control (MAC) address of the first device;
determining a window of time during which the first device was manufactured, by querying a data store using at least the MAC address of the first device;
determining a range of serial numbers assigned to devices during the window of time,
wherein analyzing the plurality of characteristics against a set of expected characteristics of the first device type further comprises:
validating a serial number assigned to the first device by determining whether the serial number is within the range of serial numbers assigned to devices during the window of time.

15. A system, comprising:
one or more computer processors; and
a non-transitory computer-readable memory containing computer program code that, when executed by operation of the one or more computer processors, performs an operation comprising:
determining a plurality of characteristics for a first device of a first device type, comprising:
determining a media access control (MAC) address of the first device;
determining a window of time during which the first device was manufactured, by querying a data store using at least the MAC address of the first device; and
determining a range of serial numbers assigned to devices during the window of time;
analyzing the plurality of characteristics against a set of expected characteristics of the first device type, comprising validating a serial number assigned to the first device by determining whether the serial number is within the range of serial numbers assigned to devices during the window of time;
monitoring runtime behavior of the first device over a window of time to collect runtime behavior data;
analyzing the runtime behavior data for the first device to determine whether the first device is operating in a manner consistent with the first device type; and
upon determining that the analyzed plurality of characteristics is consistent with the set of expected characteristics and that the first device is operating in a manner consistent with the first device type, generating a security profile for the first device designating the first device as a trusted device.

16. The system of claim 15, wherein monitoring runtime behavior of the first device over a window of time to collect runtime behavior data further comprises:
generating an occurrence of a stimulus event for the first device; and
monitoring behavior of the first device responsive to the stimulus event and timing of the behavior,
wherein analyzing the runtime behavior data for the first device to determine whether the first device is operating in a manner consistent with the first device type further comprises:
determining whether the behavior and the timing of the behavior of the first device are consistent with the first device type.

17. The system of claim 15, wherein monitoring runtime behavior of the first device over a window of time the collect runtime behavior data further comprises:
monitoring network traffic generated by the first device on a data communications network,
wherein analyzing the runtime behavior data for the first device further comprises determining whether the network traffic generated by the first device is consistent in quantity and composition with the first device type.

18. The system of claim 15, wherein generating the security profile for the first device designating the first device as a trusted device further comprises:
transitioning from a first trust level of the first device to a second trust level of the first device using predefined state transition logic, wherein the first and second trust levels are selected from a predefined plurality of trust levels, and wherein the predefined plurality of trust levels include at least an untrusted level, a trusted level, a probationally trusted level and a blacklisted level, and
wherein the operation further comprises:
while the first device is assigned the second trust level, receiving one or more data records collected by the first device over a data communications network;
associating an indication of the assigned second trust level with the one or more data records; and
processing the one or more data records, based at least in part on the associated indication of the assigned second trust level, comprising:
storing the one or more data records together with the associated indication of the assigned second trust level; and
taking a predefined action based on one or more data values within the one or more data records and the associated indication of the assigned second trust level, wherein taking the predefined action comprises at least one of (i) generating an automated alert based on the one or more data values satisfying one or more predefined conditions and (ii) incorporating the one or more data values into a data model based on the corresponding assigned trust level exceeding a predefined minimum trust threshold.

19. The system of claim 18, further comprising:
determining a second plurality of characteristics for the first device of the first device type;
analyzing the second plurality of characteristics against the set of expected characteristics of the first device type;
monitoring subsequent runtime behavior of the first device over a second window of time to collect second runtime behavior data;
analyzing the second runtime behavior data for the first device to determine whether the first device is operating in the manner consistent with the first device type; and
upon determining that at least (i) one or more of the analyzed plurality of characteristics are not consistent with the set of expected characteristics and (ii) the first device is operating in a manner inconsistent with the first device type:

generating a second security profile for the first device designating the first device as a blacklisted device.

20. A non-transitory computer-readable medium containing computer program code that, when executed by operation of one or more computer processors, performs an operation comprising:

determining a plurality of characteristics for a first device of a first device type, comprising:

determining a media access control (MAC) address of the first device;

determining a window of time during which the first device was manufactured, by querying a data store using at least the MAC address of the first device; and determining a range of serial numbers assigned to devices during the window of time;

analyzing the plurality of characteristics against a set of expected characteristics of the first device type, comprising validating a serial number assigned to the first device by determining whether the serial number is within the range of serial numbers assigned to devices during the window of time;

monitoring runtime behavior of the first device over a window of time to collect runtime behavior data;

analyzing the runtime behavior data for the first device to determine whether the first device is operating in a manner consistent with the first device type; and upon determining that the analyzed plurality of characteristics is consistent with the set of expected characteristics and that the first device is operating in a manner consistent with the first device type, generating a security profile for the first device designating the first device as a trusted device.

* * * * *